(12) United States Patent
Ohta et al.

(10) Patent No.: US 9,241,099 B2
(45) Date of Patent: Jan. 19, 2016

(54) CAMERA MODULE AND ELECTRONIC DEVICE

(71) Applicant: SHARP KABUSHIKI KAISHA, Osaka-shi, Osaka (JP)

(72) Inventors: Keisuke Ohta, Osaka (JP); Yoshihiro Sohtome, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 0 days.

(21) Appl. No.: 14/434,291

(22) PCT Filed: Oct. 10, 2013

(86) PCT No.: PCT/JP2013/077623
§ 371 (c)(1),
(2) Date: Apr. 8, 2015

(87) PCT Pub. No.: WO2014/058023
PCT Pub. Date: Apr. 17, 2014

(65) Prior Publication Data
US 2015/0264248 A1    Sep. 17, 2015

(30) Foreign Application Priority Data

Oct. 12, 2012  (JP) ................. 2012-227410

(51) Int. Cl.
*H04N 5/232* (2006.01)
*H04N 5/225* (2006.01)
*G02B 7/08* (2006.01)
*G02B 7/04* (2006.01)

(52) U.S. Cl.
CPC ............. *H04N 5/23212* (2013.01); *G02B 7/04* (2013.01); *G02B 7/08* (2013.01); *H04N 5/2254* (2013.01); *H04N 5/2257* (2013.01)

(58) Field of Classification Search
CPC ..... H04N 5/232; H04N 5/225; H04N 5/2254; H04N 5/2257; H04N 5/23212
See application file for complete search history.

(56) References Cited

U.S. PATENT DOCUMENTS

| 8,199,410 B2 | 6/2012 | Haugholt et al. |
| 2007/0179201 A1 | 8/2007 | Maillard et al. |
| 2008/0037143 A1* | 2/2008 | Yoon ........................ G02B 7/08 359/824 |

(Continued)

FOREIGN PATENT DOCUMENTS

| CN | 201015004 | 1/2008 |
| CN | 102486566 | 6/2012 |

(Continued)

OTHER PUBLICATIONS

International Search Report for PCT/JP2013/077623 mailed Nov. 12, 2013, 5 pages.

(Continued)

*Primary Examiner* — Nicholas Giles
*Assistant Examiner* — Abdelaaziz Tissire
(74) *Attorney, Agent, or Firm* — Nixon & Vanderhye, P.C.

(57) ABSTRACT

A lens barrel (12) of a camera module (1) is provided with an electrode terminal which is connected to a focus adjusting device (11) and to an electrode terminal (32) of a holder (13). The electrode terminal (32) of the holder (13) faces the electrode terminal of the lens barrel (12) which electrode terminal changes in position in accordance with movement of the lens barrel (12) which movement is caused with the use of a lens barrel moving mechanism.

5 Claims, 9 Drawing Sheets

(56) References Cited

U.S. PATENT DOCUMENTS

| | | | | |
|---|---|---|---|---|
| 2008/0122967 | A1* | 5/2008 | Huang | G02B 7/08 348/340 |
| 2008/0266681 | A1* | 10/2008 | Shyu | G02B 7/08 359/824 |
| 2011/0013063 | A1* | 1/2011 | Yamamoto | G02B 7/04 348/294 |
| 2011/0228154 | A1* | 9/2011 | Westerweck | G03B 17/28 348/311 |
| 2011/0304754 | A1* | 12/2011 | Tsai | H01L 27/14618 348/294 |
| 2013/0033639 | A1* | 2/2013 | Iwafuchi | H01L 27/14618 348/372 |
| 2013/0194490 | A1* | 8/2013 | Okuyama | G02B 7/08 348/374 |

FOREIGN PATENT DOCUMENTS

| | | |
|---|---|---|
| JP | 2005-237144 | 9/2005 |
| JP | 2006-145957 | 6/2006 |
| JP | 2009-525501 | 7/2009 |

OTHER PUBLICATIONS

Written Opinion of the International Searching Authority (JP language) for PCT/JP2013/077623, dated Nov. 12, 2013, 3 pages.

* cited by examiner

CAMERA MODULE AND ELECTRONIC DEVICE

This application is the U.S. national phase of International Application No. PCT/JP2013/077623 filed 10 Oct. 2013 which designated the U.S. and claims priority to JP Patent Application No. 2012-227410 filed 12 Oct. 2012, the entire contents of each of which are hereby incorporated by reference.

TECHNICAL FIELD

The present invention relates to (i) a camera module which is mounted in, for example, a mobile phone and which includes a focus adjusting device and (ii) an electronic device.

BACKGROUND ART

In recent years, cameras are embedded in wide variety of products. In general, the cameras are mounted, as camera modules, in electronic devices such as a mobile phone and a laptop computer. In a case where the camera modules are mounted in such small-sized electronic devices, it is strongly required to downsize the cameras themselves or to reduce electric power consumed by the cameras themselves.

Such camera modules include, in some cases, a focus adjusting mechanism which changes a focal distance or a focal position of an optical system. Conventional focus adjusting mechanisms often employ a method of adjusting a focus by moving a lens. As a method of moving a lens, there are known (i) a voice coil motor method in which a lens is moved up and down by use of a magnetic force or (ii) a method in which a lens is moved by driving a piezoelectric element.

Those methods require a lens driving mechanism which moves a lens. Therefore, the camera modules have disadvantages such that they are complicated in structure and that they need relatively large amount of electric power. Furthermore, the camera modules have a disadvantage such that they are generally low in impact resistance.

In view of this, various focus adjusting mechanisms which do not require a lens driving mechanism that moves a lens have been suggested for the purpose of downsizing the camera modules and reducing electric power consumed by the camera modules. Such focus adjusting mechanisms are disclosed in, for example, Patent Literature 1 through 3.

A focus adjusting mechanism disclosed in Patent Literature 1 employs a method of adjusting a focus by changing a refractive index of a liquid crystal lens. According to the method, a liquid crystal lens is provided. By changing refractive index distribution of the liquid crystal lens by changing a voltage (drive voltage) applied to the liquid crystal lens, the liquid crystal lens is caused to function as a varifocal lens.

A focus adjusting mechanism disclosed in Patent Literature 2 is configured such that a drive shaft is connected to a piezoelectric element and is provided with a lens. According to the focus adjusting mechanism, the piezoelectric element is expanded and contracted by applying a voltage to the piezoelectric element. This causes the drive shaft to be moved and, accordingly, causes the lens to be moved.

A focus adjusting mechanism disclosed in Patent Literature 3 employs a liquid lens.

A focus adjusting mechanism disclosed in Patent Literature 4 includes a polymer-type lens. A cover is provided on a soft polymer layer, and a piezoelectric element is provided on the cover. According to the focus adjusting mechanism, the piezoelectric element is expanded and contracted by applying a voltage to the piezoelectric element. This causes the cover and the soft polymer layer to be deformed and, accordingly, causes a focal distance to be adjusted.

Such a focus adjusting mechanism that does not require a lens moving mechanism is generally mounted on an upper surface of a lens barrel of a fixed focus camera module. The focus adjusting mechanism causes the fixed focus camera module to function as a varifocal camera module. Specifically, in a case where a voltage is applied to the focus adjusting mechanism, this causes a change in a refractive index and, accordingly, causes a focal position to be adjusted.

A step of assembling the fixed focus camera module includes a step of adjusting a height of the lens barrel including the lens. This step is generally carried out so as to adjust a focus of the camera module to infinity (for example, 2 m to 4 m).

As a method of carrying out the step of adjusting a height of a lens barrel, there is kwon a method in which a height of a lens barrel is adjusted by (i) forming threads on an outer surface of the lens barrel and an inner surface of a holder of a camera module which threads engage with each other and (ii) rotating the lens barrel in the holder.

CITATION LIST

Patent Literature 1
Japanese Patent Application Publication, Tokukai, No. 2006-145957 A (Published on Jun. 8, 2006)
Patent Literature 2
Japanese Patent Application Publication, Tokukai, No. 2005-237144 A (Published on Sep. 2, 2005)
Patent Literature 3
Japanese Translation of PCT International Application Publication, Tokuhyo, No. 2009-525501 A (Published on Jul. 9, 2009)
Patent Literature 4
The specification of U.S. Pat. No. 8,199,410 B2 (Registered on Jun. 12, 2012)

SUMMARY OF INVENTION

Technical Problem

In a case where a focus adjusting device which does not require a lens moving mechanism is embedded in a fixed focus camera module, the focus adjusting device can be embedded in the fixed focus camera module without adjustment of a height of a lens barrel. However, in consideration of assembly accuracy and a yield rate in production process, it is preferable to adjust the height of the lens barrel.

Meanwhile, in a case where the height of the lens barrel is adjusted in a state where the focus adjusting mechanism is not mounted on the fixed focus camera module, a difference in aberration and/or the like arises between the fixed focus camera module and another and, accordingly, a variation occurs in assembly accuracy. This causes a decrease in yield rate, as compared with the case where the focus adjusting mechanism is mounted on the fixed focus camera module. Therefore, it is preferable to adjust the height of the lens barrel in a state where the focus adjusting mechanism is mounted on the fixed focus camera module.

However, according to a conventional fixed focus camera module, in a case where (i) a voltage-applied-type focus adjusting device which does not require a lens moving mechanism is mounted on an upper surface of a lens barrel and (ii) a height of the lens barrel is adjustable, the conventional fixed focus camera module has a problem such that it is not possible to appropriately apply a voltage to the focus adjusting device, depending on how an electrode is disposed.

In view of this, the object of the present invention is to provide a camera module and an electronic device, which camera module is capable of appropriately applying a voltage to a voltage-applied-type focus adjusting device even in a case where the camera module is configured such that (i) the voltage-applied-type focus adjusting device, which does not require a lens moving mechanism for moving a lens, is mounted on an upper surface of a lens barrel and (ii) a height of the lens barrel is adjustable.

Solution to Problem

In order to attain the above object, a camera module in accordance with an aspect of the present invention includes: a holder; a lens barrel held by the holder, the lens barrel having an element disposition part and including a plurality of lenses that form an image of an object on an image capturing element; and a focus adjusting optical element disposed on the element disposition part, the focus adjusting optical element adjusting a focal distance upon receipt of a drive voltage, the holder being provided with a holder first electrode terminal, the lens barrel being provided with at least one lens barrel first electrode terminal which is connected to the focus adjusting optical element disposed on the element disposition part and which is connected to the holder first electrode terminal provided on the holder, at least one of the holder and the lens barrel having a lens barrel moving mechanism which causes the lens barrel to move with respect to the holder so that a position of the lens barrel is adjusted, the holder first electrode terminal being provided so as to face the at least one lens barrel first electrode terminal which changes in position with respect to the holder in accordance with movement of the lens barrel which movement is caused with the use of the lens barrel moving mechanism.

Advantageous Effects of Invention

According to an aspect of the present invention, even in a case where a camera module is configured such that, in a state where a focus adjusting optical element is disposed on an element disposition part of the lens barrel, a position of a lens barrel can be adjusted by moving, with respect to a holder, the lens barrel with the use of a lens barrel moving mechanism, it is possible to appropriately apply, to the focus adjusting optical element, a drive voltage applied to a holder first electrode terminal. This makes it possible to realize a camera module which is high in adjustment accuracy and good in yield rate.

DESCRIPTION OF EMBODIMENTS

Overview of Camera Module

Figure 1:
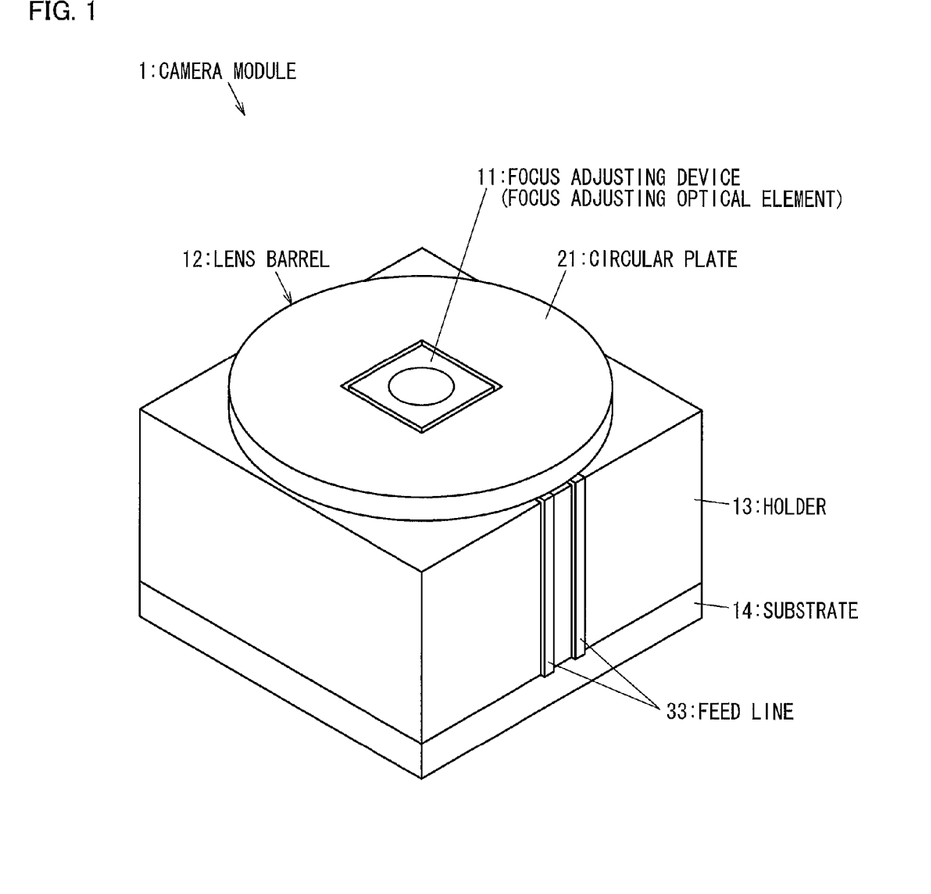
FIG. 1 is a perspective view illustrating a camera module in accordance with an embodiment of the present invention.
Figure 2:
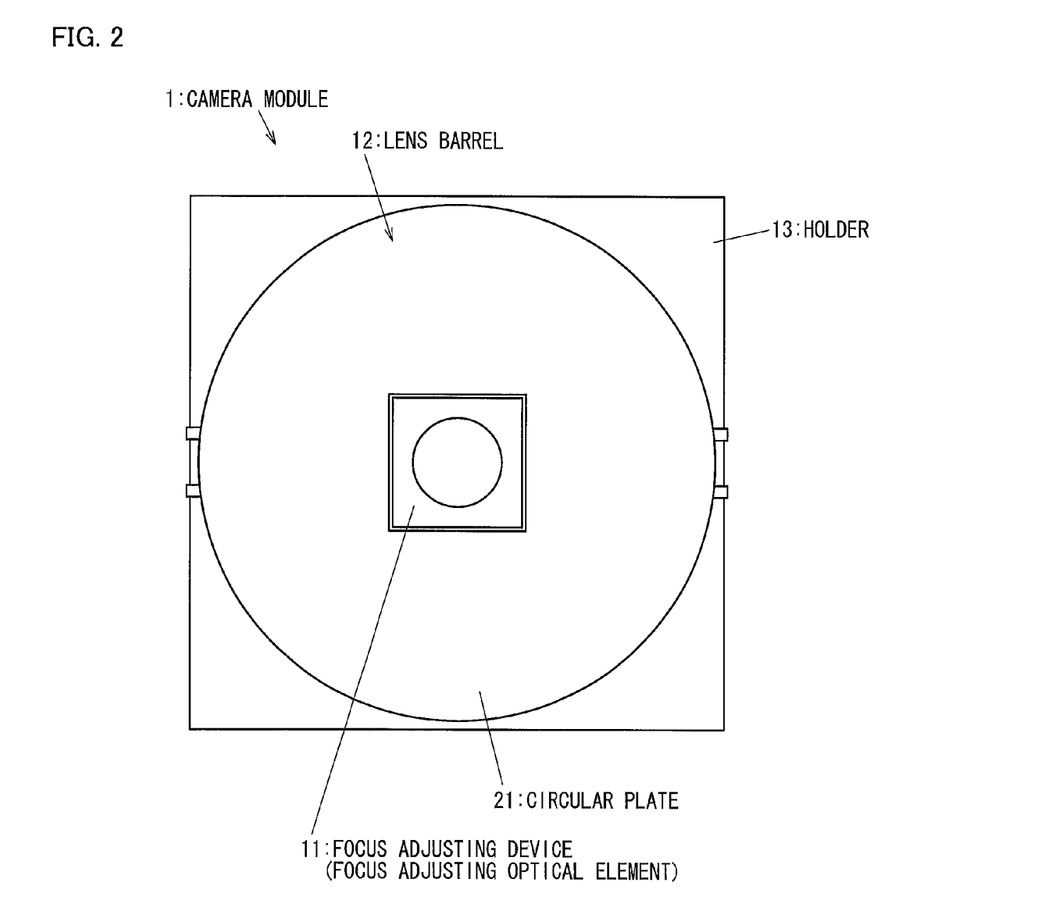
FIG. 2 is a plan view of the camera module illustrated in FIG. 1.
Figure 3:
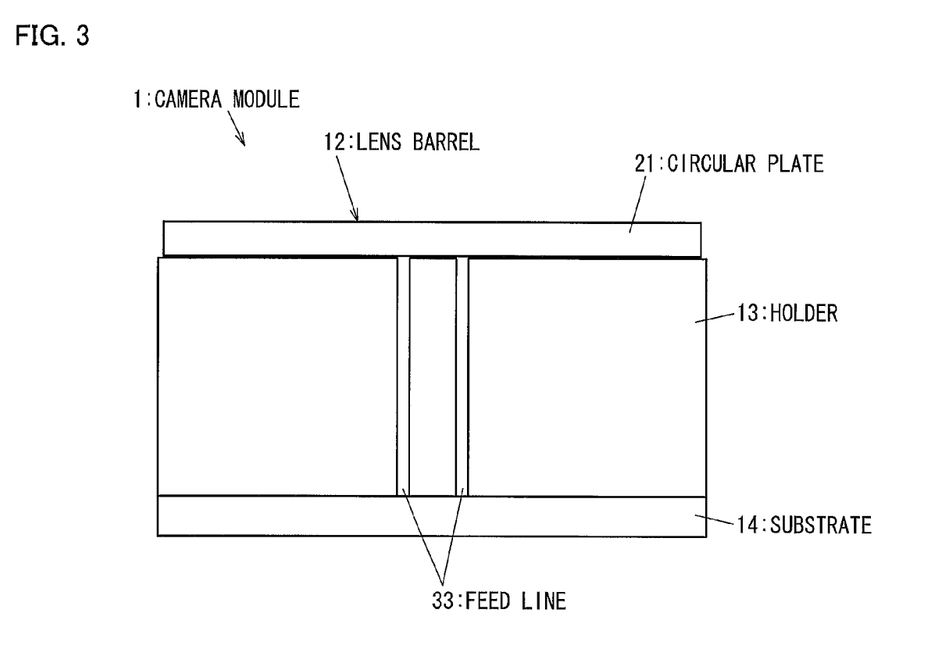
FIG. 3 is a front view of the camera module illustrated in FIG. 1.
Figure 4:
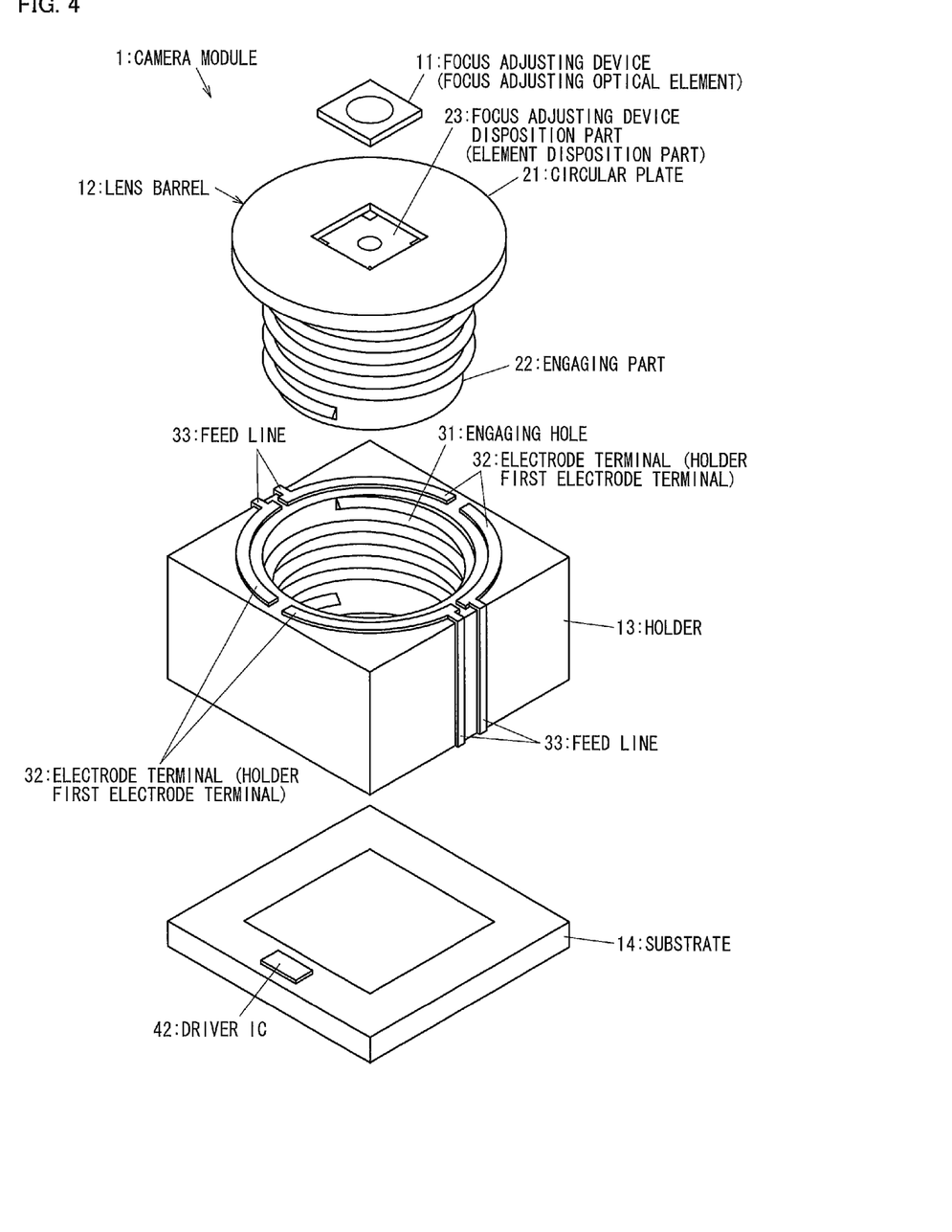
FIG. 4 is an exploded perspective view of the camera module illustrated in FIG. 1.

The following description will discuss an embodiment of the present invention with reference to the drawings. FIG. 1 is a perspective view illustrating a camera module in accordance with an embodiment of the present invention. FIG. 2 is a plan view of the camera module illustrated in FIG. 1. FIG. 3 is a front view of the camera module illustrated in FIG. 1. FIG. 4 is an exploded perspective view of the camera module illustrated in FIG. 1

As illustrated in FIGS. 1 through 4, a camera module 1 includes a focus adjusting device (focus adjusting optical element) 11, a lens barrel 12, a holder 13, and a substrate 14.

(Holder)

The holder 13 is provided on the substrate 14, and the lens barrel 12 is embedded in the holder 13. Specifically, the lens barrel 12 is arranged such that a circular plate 21 on an upper side of the lens barrel 12 is connected to an engaging part 22 on a lower side of the lens barrel 12. The engaging part 22 has a shape of a cylinder or a column whose side surface is a circumferential surface. The holder 13 has an engaging hole 31 which passes through the holder 13 in an up and down direction and with which the engaging part 22 of the lens barrel 12 engages.

(Lens Barrel)

The lens barrel 12 includes therein a plurality of lenses (not illustrated) serving as image forming optical elements. The plurality of lenses form an image, read by the camera module 1, on a surface of an image sensor provided on the substrate 14.

The engaging part 22 of the lens barrel 12 has, on its outer circumferential surface, an external thread (lens barrel moving mechanism) 27. Meanwhile, the engaging hole 31 of the holder 13 has an internal thread (lens barrel moving mechanism) 34 corresponding to the external thread 27 of the engaging part 22. Therefore, in a state where the engaging part 22 of the lens barrel 12 engages with the engaging hole 31 of the holder 13, it is possible to adjust a height of the lens barrel 12 with respect to the holder 13 by rotating the lens barrel 12.

(Focus Adjusting Device Disposition Part)

A focus adjusting device disposition part (element disposition part) 23 is provided in a central part of an upper surface of the circular plate 21 of the lens barrel 12. The focus adjusting device disposition part 23 has a shape of a recess so as to correspond to a shape of the focus adjusting device 11. In the present embodiment, since the focus adjusting device 11 has a shape of a square plate, the focus adjusting device disposition part 23 has a shape of a square recess.

The focus adjusting device 11 is a voltage-applied-type focus adjusting device which adjusts a focus in a case where a voltage is applied to the focus adjusting device 11. For example, the focus adjusting device 11 includes such a polymer-type lens that is disclosed in Patent Literature 4.

Figure 5:
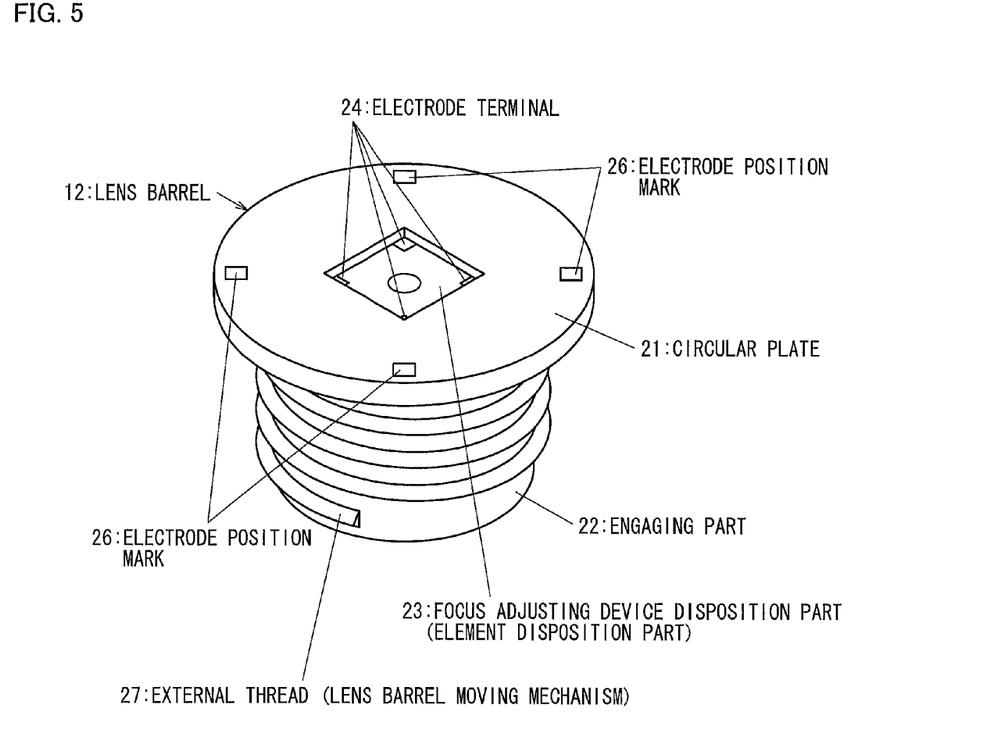
FIG. 5 is a perspective view of a lens barrel illustrated in FIG. 1.

Electrode terminals 24 are provided at respective corners located inside the focus adjusting device disposition part 23 (see FIG. 5). FIG. 5 is a perspective view of the lens barrel 12 illustrated in FIG. 1. The electrode terminals 24 are in contact with and connected with respective electrodes (not illustrated) provided on a back surface of the focus adjusting device 11. Electrode position marks 26 which indicate positions of the electrode terminals 24 are provided at positions on an upper surface of the lens barrel 12 which positions correspond to the respective positions of the electrode terminals 24.

(Connection Between Electrode Terminals of Lens Barrel and Electrode Terminals of Holder)

Figure 6:
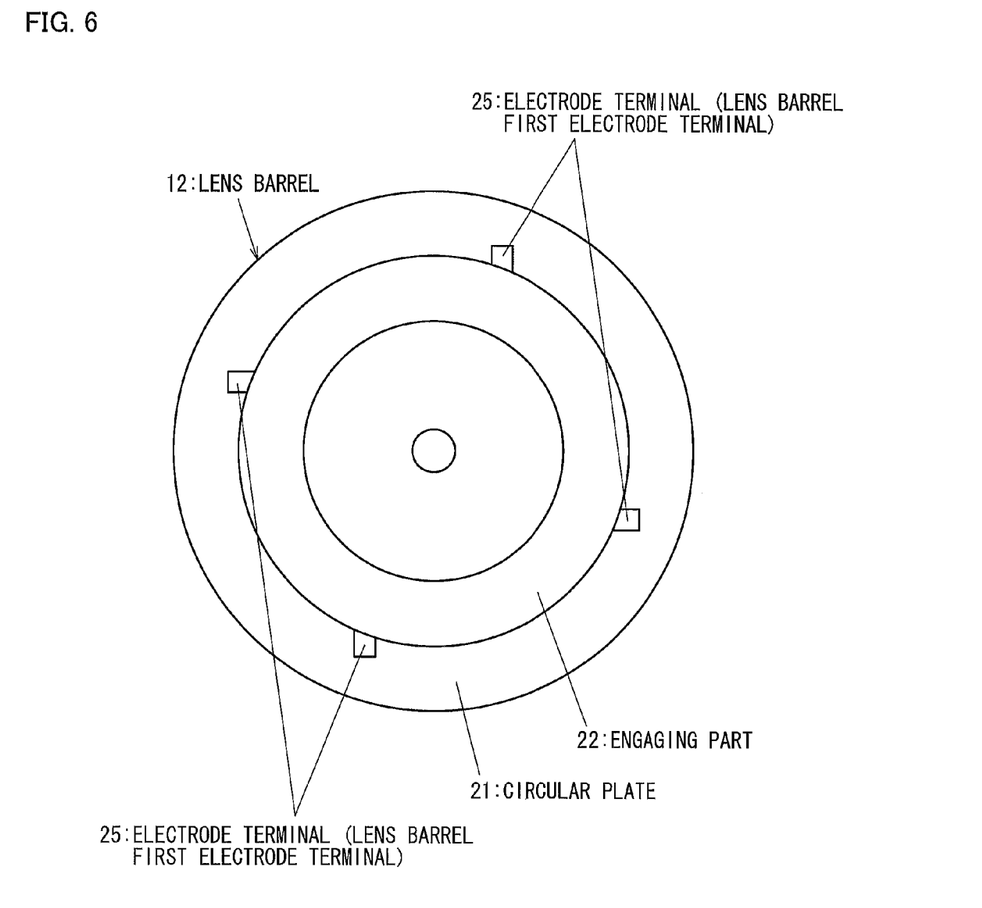
FIG. 6 is a plan view illustrating a bottom surface of the lens barrel illustrated in FIG. 1.

Electrode terminals (lens barrel first electrode terminals) 25 are provided on a back surface of the circular plate 21 of the lens barrel 12 so as to correspond to the respective electrode terminals 24 (see FIG. 6). FIG. 6 is a plan view illustrating a bottom surface of the lens barrel 12. The four electrode terminals 24 are connected to the respective corresponding four electrode terminals 25.

Figure 7:
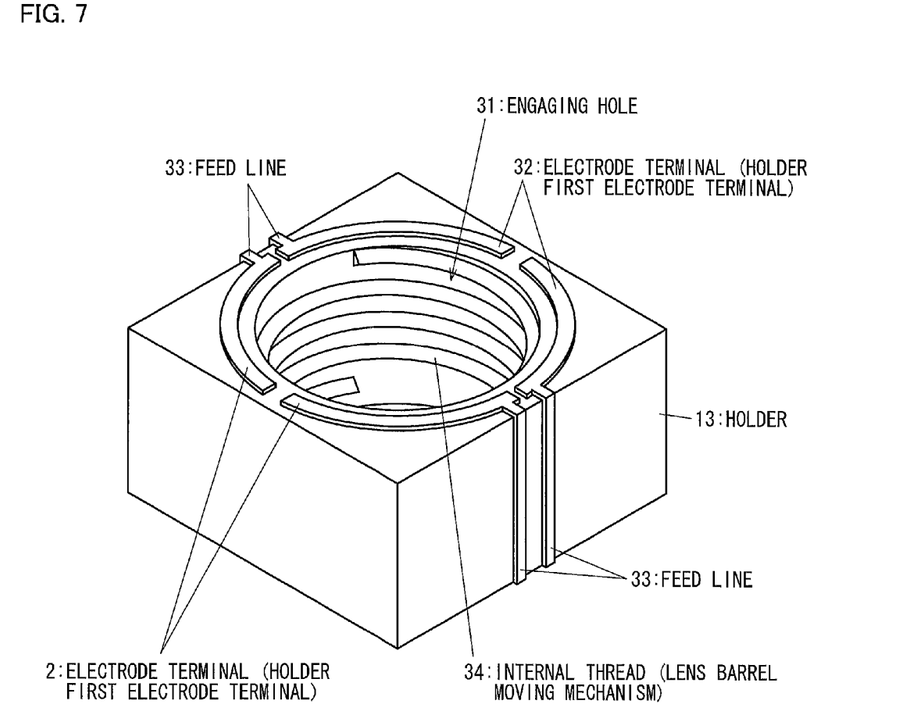
FIG. 7 is a perspective view of a holder, illustrated in FIG. 1, on which four electrode terminals are provided.

The four electrode terminals 25 of the lens barrel 12 are connected to respective different four electrode terminals (holder first electrode terminals) 32 provided on an upper surface of the holder 13 illustrated in FIG. 7. FIG. 7 is a perspective view of the holder 13 on which the four electrode terminals 32 are provided.

Figure 8:
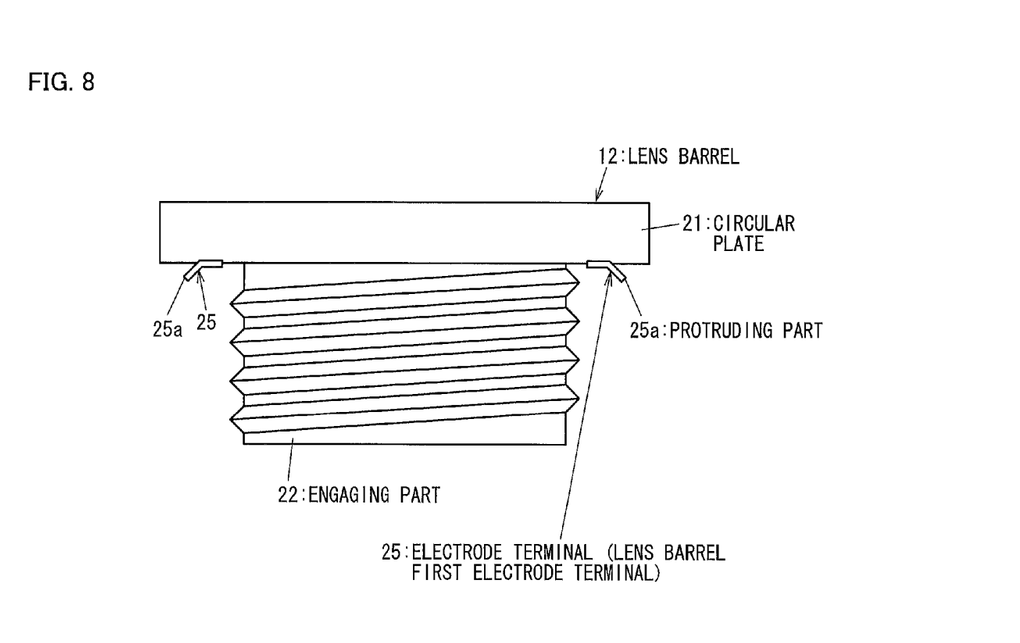
FIG. 8 is a front view of the lens barrel illustrated in FIG. 1.

The electrode terminals 25 can be connected to the respective electrode terminals 32 by, for example, filling an electrically conductive adhesive between the electrode terminal 25 and the electrode terminals 32 so that an electrically conductive layer is formed therebetween, after the height of the lens barrel 12 is adjusted. Alternatively, as illustrated in FIG. 8, the electrode terminals 25 can be connected to the respective electrode terminals 32 by bending end parts of the electrode terminals 25 downward so that the electrode terminals 25 have protruding parts which protrude downward and that such protruding parts 25a of the electrode terminals 25 are in contact with the respective electrode terminals 32. In this case, the protruding parts 25a or the electrode terminals 25 themselves are arranged so as to be elastic. This allows the protruding parts 25a to be in contact with the respective electrode terminals 32 even in a case where a gap between the protruding parts 25a and the electrode terminals 32 varies.

FIG. 8 is a front view of the lens barrel 12. Note that the electrode terminals 25 can be connected to the respective electrode terminals 32 by employing a known connecting structure, for example, by providing elastic protruding parts to the respective electrode terminals 25.

The four electrode terminals 32 of the holder 13 are separately provided, on the upper surface of the holder 13, along a periphery of the engaging hole 31, that is, provided at positions on the upper surface of the holder 13 which positions correspond to the respective four electrode terminals 25 of the lens barrel 12 so as to form respective quarter arcs and collectively form a circle (see FIG. 7). This allows the electrode terminals 25 of the lens barrel 12 to be absolutely connected to the respective electrode terminals 32 of the holder 13 even in a case where the height of the lens barrel 12 is adjusted by rotating the lens barrel 12.

Figure 9:
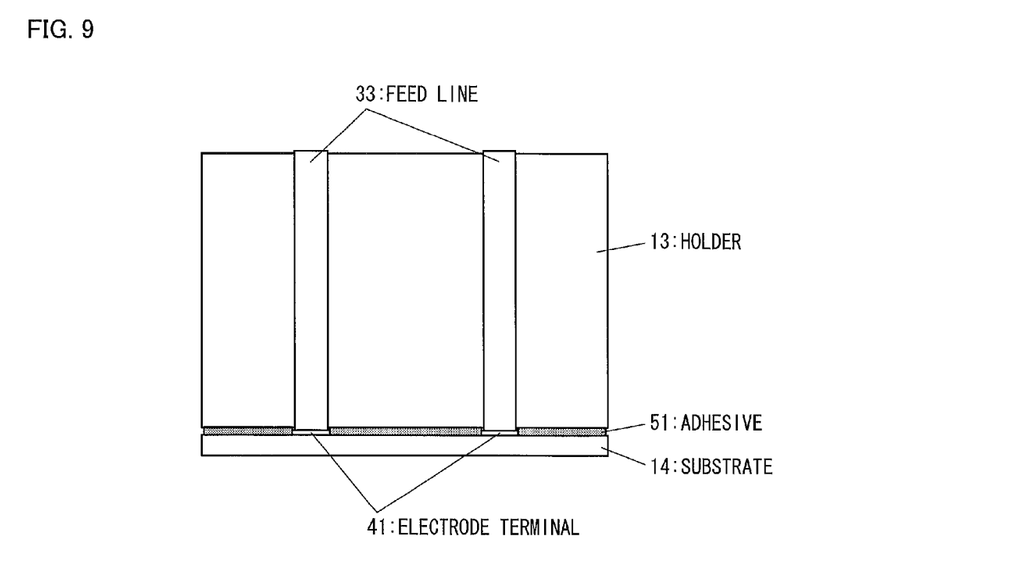
FIG. 9 is a front view illustrating the holder and a substrate illustrated in FIG. 1.

Feed lines 33 are connected to the respective electrode terminals 32. The feed lines 33 extend downward along the holder 13 from the respective electrode terminals 32, reach a lower surface of the holder 13, and are connected to respective electrode terminals 41 provided on an upper surface of the substrate 14 (see FIG. 9). FIG. 9 is a front view illustrating the holder 13 and the substrate 14.

(Adhesion Between Holder and Substrate)

As illustrated in FIG. 9, the holder 13 and the substrate 14 are adhered to each other by an adhesive layer 51 provided between the lower surface of the holder 13 and the upper surface of the substrate 14. A driver IC 42, serving as a control section which controls a voltage to be applied to the focus adjusting device 11, is mounted on the substrate 14. The driver IC 42 is connected to the electrode terminals 41 of the substrate 14.

(Advantages of Camera Modules)

According to the camera module 1 having the above configuration, in a case where the focus adjusting device 11 is disposed on the focus adjusting device disposition part 23 of the lens barrel 12, the electrodes provided on the back surface of the focus adjusting device 11 are in contact with the respective electrode terminals 24 provided on the focus adjusting device disposition part 23. The electrode terminals 24 of the lens barrel 12 are connected to the respective electrode terminals 25 provided on the back surface of the circular plate 21 of the lens barrel 12. The electrode terminals 25 are connected to the respective electrode terminals 32 provided on the upper surface of the holder 13. The electrode terminals 32 of the holder 13 are connected to the respective electrode terminals 41 of the substrate 14 via the respective feed lines 33. The electrode terminals 41 are connected to the driver IC 42 mounted on the substrate 14. Therefore, the focus adjusting device 11 is connected to the driver IC 42. This allows a drive voltage to be applied to the focus adjusting device 11 from the driver IC 42.

Further, it is possible to adjust the height of the lens barrel 12 by rotating the lens barrel 12 with respect to the holder 13.

Therefore, according to the camera module 1 configured such that (i) the focus adjusting device 11 of voltage-applied-type, which does not require a lens moving mechanism, is disposed on the upper surface of the lens barrel 12 and (ii) the height of the lens barrel 12 is adjustable, it is possible to appropriately apply a voltage to the focus adjusting device 11. This allows the camera module 1 to be high in assembly accuracy and to have an improved yield rate in production process.

(Other Examples of Electrode Terminals of Holder)

Figure 10:
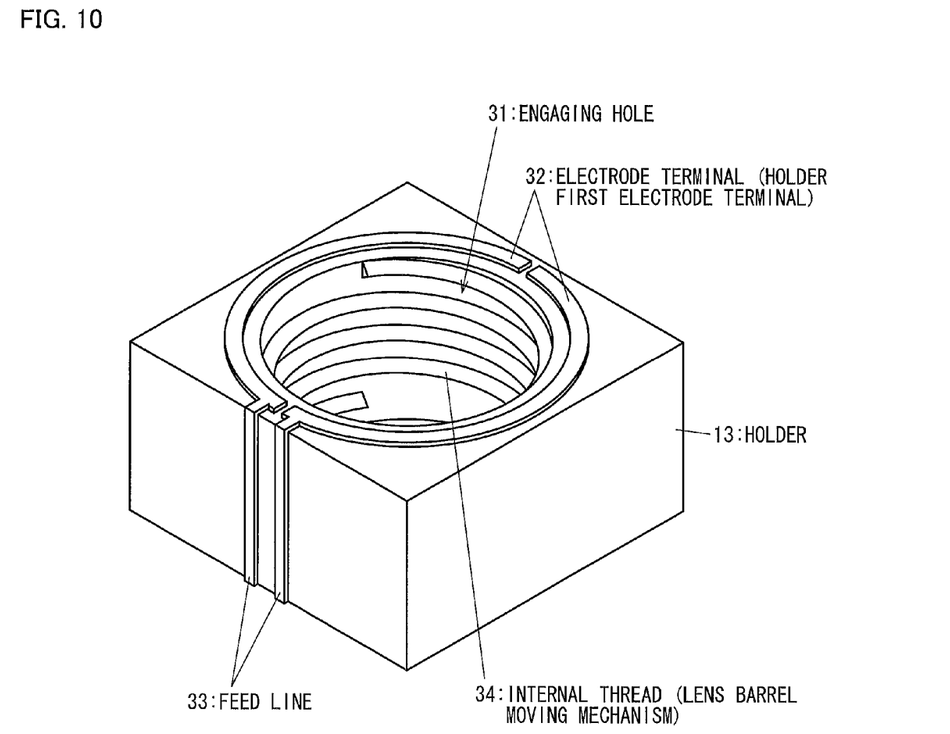
FIG. 10 is a perspective view of the holder, illustrated in FIG. 1, on which two electrode terminals are provided.

Note that the number of the electrode terminals 24, the number of the electrode terminals 25, and the number of the electrode terminals 32 are each identical to the number of the electrodes provided on the focus adjusting device 11. However, the number of the electrode terminals the number of the electrode terminals 25, and the number of the electrode terminals 32 are each not limited to four as described above, and can be, for example, two. In this case, the two electrode terminals 32 of the holder 13 are separately provided, on the upper surface of the holder 13, along the periphery of the engaging hole 31, that is, provided at positions on the upper surface of the holder 13 which positions correspond to the respective two electrode terminals 25 of the lens barrel 12 so as to form respective one-half arcs and collectively form a circle (see FIG. 10). FIG. 10 is a perspective view of the holder 13 on which the two electrode terminals 32 are provided.

(Others)

Note that, in the present Embodiment, the lens barrel moving mechanism, for adjusting the height of the lens barrel 12 by causing the lens barrel 12 to move forward and backward with respect to the holder 13, is made up of the external thread 27 of the lens barrel 12 and the internal thread 34 of the holder 34. However, the lens barrel moving mechanism can be alternatively configured in a well-known manner so as to cause the lens barrel 12 to move forward and backward with respect to the holder 13 by rotation of the lens barrel 12. For example, the lens barrel moving mechanism can be made up of (i) a protruding part which is provided instead of one of the external thread 27 of the lens barrel 12 and internal thread 34 of the holder 13 and (ii) a helical groove which is provided instead of the other and with which the protruding part engages.

The lens barrel moving mechanism only need to be provided on at least one of the holder 13 and the lens barrel 12 and to be capable of causing the lens barrel 12 to move with respect to the holder 13 so that a position of the lens barrel 12 is adjusted.

SUMMARY

A camera module in accordance with an aspect of the present invention includes: a holder; a lens barrel held by the holder, the lens barrel having an element disposition part and including a plurality of lenses that form an image of an object on an image capturing element; and a focus adjusting optical element (focus adjusting device 11) disposed on the element disposition part, the focus adjusting optical element adjusting a focal distance upon receipt of a drive voltage, the holder being provided with a holder first electrode terminal (electrode terminals 32), the lens barrel being provided with at least one lens barrel first electrode terminal (electrode terminals 25) which is connected to the focus adjusting optical element disposed on the element disposition part and which is connected to the holder first electrode terminal provided on the holder, at least one of the holder and the lens barrel having a lens barrel moving mechanism which causes the lens barrel to move with respect to the holder so that a position of the lens barrel is adjusted, the holder first electrode terminal being provided so as to face the at least one lens barrel first electrode terminal which changes in position with respect to the holder in accordance with movement of the lens barrel which movement is caused with the use of the lens barrel moving mechanism.

According to the above configuration, the lens barrel first electrode terminal is connected to the focus adjusting optical element disposed on the element disposition part and is connected to the holder first electrode terminal of the holder. The holder first electrode terminal is provided so as to face the lens barrel first electrode terminal which changes in position with respect to the holder in accordance with movement of the lens barrel which movement is caused with the use of the lens barrel moving mechanism.

Therefore, even in a case where the camera module is configured such that, in a state where the focus adjusting optical element is disposed on the element disposition part of the lens barrel, a position of the lens barrel can be adjusted by moving, with respect to the holder, the lens barrel with the use of the lens barrel moving mechanism, it is possible to appropriately apply, to the focus adjusting optical element, a drive voltage applied to the holder first electrode terminal. This makes it possible to realize a camera module which is high in adjustment accuracy and good in yield rate.

Further, the camera module in accordance with an aspect of the present invention can be arranged such that: the holder has an engaging hole which passes through the holder; the holder first electrode terminal is provided on an upper surface of the holder so as to form a circle around the engaging hole; the lens barrel moving mechanism causes the lens barrel to move forward and backward in an axial direction of the engaging hole with respect to the holder by rotation of the lens barrel; the lens barrel has (i) an engaging part which engages with the engaging hole and whose side surface is a circumferential surface and (ii) a circular plate which is provided on an upper side of the engaging part and which faces the upper surface of the holder; and the at least one lens barrel first electrode terminal is provided on a surface of the circular plate, which surface faces the upper surface of the holder, so as to face the holder first electrode terminal.

According to the above configuration, the holder first electrode terminal is provided on the upper surface of the holder so as to draw a circle around the engaging hole. Therefore, even in a case where the lens barrel is rotated with the use of the lens barrel moving mechanism so that the position of the lens barrel is adjusted, the lens barrel first electrode terminal, provided on the surface of the circular plate of the lens barrel which surface faces the upper surface of the holder, faces the holder first electrode terminal. Accordingly, it is possible to easily connect the lens barrel first electrode terminal to the holder first electrode terminal by, for example, filling an electrically conductive adhesive between the lens barrel first electrode terminal and the holder first electrode terminal or by forming, on the lens barrel first electrode terminal, a protruding part which is in contact with the holder first electrode terminal.

Furthermore, the camera module in accordance with an aspect of the present invention can be arranged such that the at least one lens barrel first electrode terminal includes a plurality of lens barrel first electrode terminals; and the holder first electrode terminal is divided into separate arcs the number of which is identical to the number of the plurality of lens barrel first electrode terminals.

According to the above configuration, the holder first electrode terminal is divided into the separate arcs the number of which is identical to the number of the plurality of lens barrel first electrode terminals. Therefore, it is possible to suitably deal with a configuration in which the focus adjusting optical element is driven by applying drive voltages to the plurality of holder first electrode terminals.

Furthermore, the camera module in accordance with an aspect of the present invention can be arranged such that the at least one lens barrel first electrode terminal has a protruding part which protrudes in a direction of the holder first electrode terminal and which is in contact with the holder first electrode terminal.

According to the above configuration, the protruding part of the lens barrel first electrode terminal is in contact with the holder first electrode terminal. It is therefore possible to absolutely connect the lens barrel first electrode terminal to the holder first electrode terminal even in a case where the position of the lens barrel is adjusted with the use of the lens barrel moving mechanism.

According to the camera module, two or more electrode terminals provided on the lens barrel are in contact with the focus adjusting optical element and are exposed outside the holder.

According to the camera module, two or more electrode terminals of the holder are provided on an upper part of the holder and are exposed outside.

According to the camera module, the focal distance adjusting optical element has, on its lower surface, two or more electrode parts.

According to the camera module, a terminal electrode provided on a lower part of the lens barrel is adhered, with the use of an electrically conductive adhesive, to a terminal electrode provided on the upper part of the holder.

According to the camera module, a mark indicative of a position of the terminal electrode is provided on an outer circumference part of the lens barrel.

The camera module includes a control section which controls, in response to an instruction given from outside, electric power to be supplied to the focus adjusting optical element.

The present invention is not limited to the description of the embodiments, but may be altered by a skilled person in the art within the scope of the claims. An embodiment derived from a proper combination of technical means disclosed in different embodiments is also encompassed in the technical scope of the present invention.

INDUSTRIAL APPLICABILITY

The camera module 1 of the present invention can be provided in an electronic device such as a digital camera and a mobile phone (for example, a mobile terminal or a digital camera which is small in size and capable of correcting an image blur). Furthermore, the camera module 1 of the present invention can be provided in an electronic device such as a smartphone, a laptop computer, a tablet terminal, an electronic book reader, a PDA (Personal Digital Assistants), and a television receiver.

REFERENCE SIGNS LIST

1 Camera module
11 Focus adjusting device (focus adjusting optical element)
12 Lens barrel
13 Holder
14 Substrate
21 Circular plate
22 Engaging part
23 Focus adjusting device disposition part (element disposition part)
24 Electrode terminal
25 Electrode terminal (lens barrel first electrode terminal)
25a Protruding part
26 Electrode position mark
27 External thread (Lens barrel moving mechanism)
31 Engaging hole
32 Electrode terminal (holder first electrode terminal)
33 Feed line
34 Internal thread (Lens barrel moving mechanism)
41 Electrode terminal
42 Driver IC

The invention claimed is:
1. A camera module comprising:
a holder;
a lens barrel held by the holder, the lens barrel having an element disposition part and including a plurality of lenses that form an image of an object on an image capturing element; and
a focus adjusting optical element disposed on the element disposition part, the focus adjusting optical element adjusting a focal distance in a case where a drive voltage is applied to the focus adjusting optical element,
the holder being provided with a holder first electrode terminal,
the lens barrel being provided with at least one lens barrel first electrode terminal which is connected to the focus adjusting optical element disposed on the element disposition part and which is connected to the holder first electrode terminal provided on the holder,
at least one of the holder and the lens barrel having a lens barrel moving mechanism which causes the lens barrel to move with respect to the holder so that a position of the lens barrel is adjusted,
the holder first electrode terminal being provided so as to face the at least one lens barrel first electrode terminal which changes in position with respect to the holder in accordance with movement of the lens barrel which movement is caused with the use of the lens barrel moving mechanism.

2. The camera module as set forth in claim 1, wherein:
the holder has an engaging hole which passes through the holder;
the holder first electrode terminal is provided on an upper surface of the holder so as to form a circle around the engaging hole;
the lens barrel moving mechanism causes the lens barrel to move forward and backward in an axial direction of the engaging hole with respect to the holder by rotation of the lens barrel;
the lens barrel has (i) an engaging part which engages with the engaging hole and whose side surface is a circumferential surface and (ii) a circular plate which is provided on an upper side of the engaging part and which faces the upper surface of the holder; and
the at least one lens barrel first electrode terminal is provided on a surface of the circular plate, which surface faces the upper surface of the holder, so as to face the holder first electrode terminal.

3. The camera module as set forth in claim 2 wherein:
the at least one lens barrel first electrode terminal includes a plurality of lens barrel first electrode terminals; and
the holder first electrode terminal is divided into separate arcs the number of which is identical to the number of the plurality of lens barrel first electrode terminals.

4. The camera module as set forth in claim 1, wherein the at least one lens barrel first electrode terminal has a protruding part which protrudes in a direction of the holder first electrode terminal and which is in contact with the holder first electrode terminal.

5. An electronic device comprising:
a camera module recited in claim 1.

* * * * *